United States Patent Office 3,481,010
Patented Dec. 2, 1969

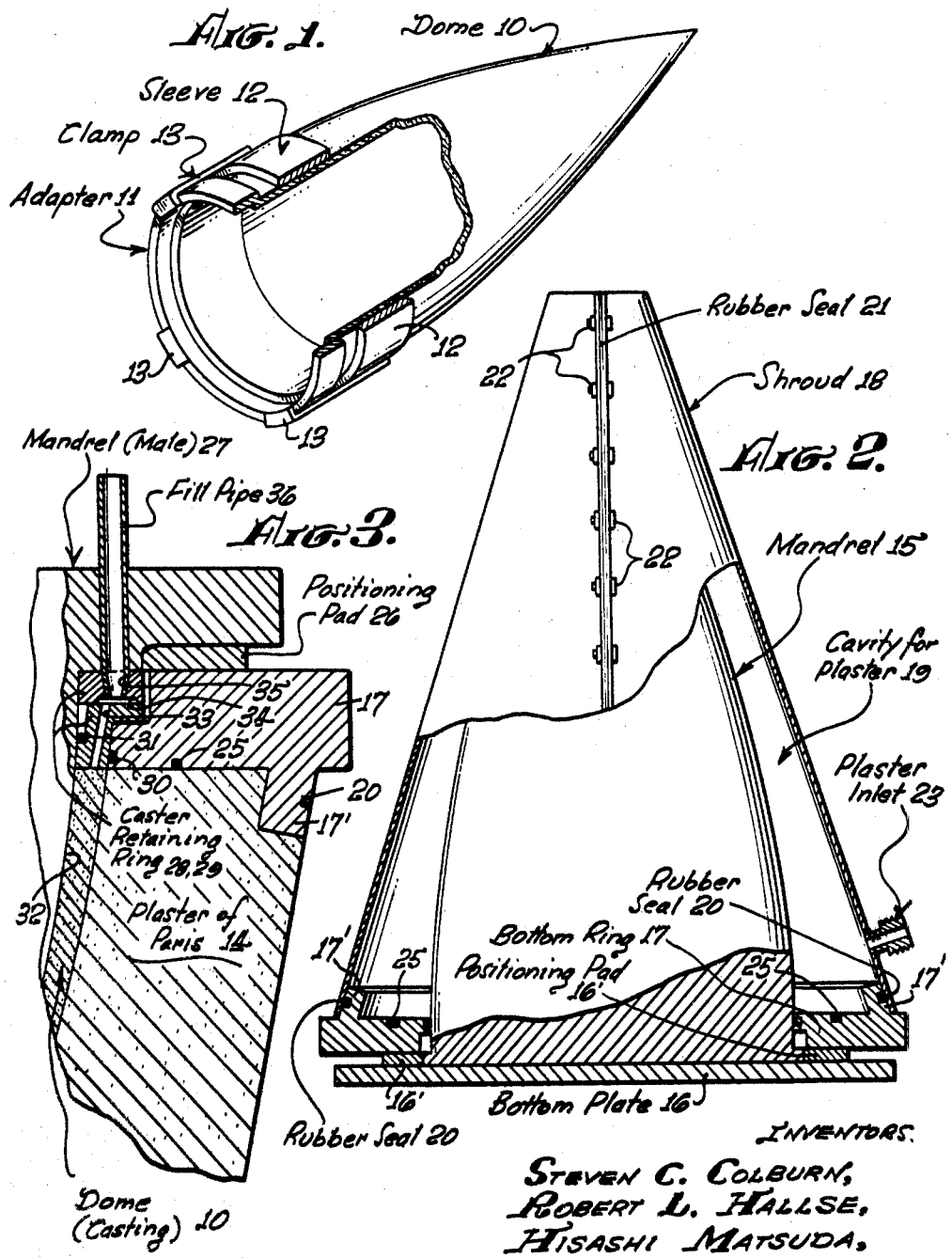

3,481,010
APPARATUS FOR FORMING CASTINGS
Steven C. Colburn, Pomona, Robert L. Hallse, Claremont, Hisashi Matsuda, Thousand Oaks, and Joel O. Mayhall, San Dimas, Calif., assignors to General Dynamics Corporation, Pomona, Calif., a corporation of Delaware
Original application Aug. 15, 1966, Ser. No. 572,546. Divided and this application, Dec. 15, 1966, Ser. No. 627,565
Int. Cl. B28b 1/26
U.S. Cl. 25—129        7 Claims

ABSTRACT OF THE DISCLOSURE

Broadly, the disclosure relates to a process for manufacturing precision cast articles such as radomes by a slip casting procedure which employs the use of a male mandrel in the plaster of Paris mold. In the inventive process, a conventional form of plaster of Paris casting mold is produced through the use of a first mandrel having a shape coresponding to the desired external surface of the ultimate article. After curing, this plaster mold is assembled with a second mandrel shaped such that its surface conforms to the desired internal surface of the ultimate article, the mandrel being mounted on a carrying element such that this second mandrel can be accurately centered within the plaster of Paris mold. A ceramic slip is then pumped into the area between the male mandrel and the plaster of Paris mold and the slip casting process is continued until the cast wall build-up contacts the male mandrel. The male mandrel is constructed of water impervious material. The contours of the plaster of Paris mold and the internal male mandrel can be changed as required by either machining the forming mandrels or by build-up of material on either or both by the use of tape, organic coatings, or the like. Thus, slip cast fused silica articles, such as randomes, are electrically correct as cast to meet desired electrical tolerances.

RELATED APPLICATIONS

This application is a divisional application of U.S. patent application Ser. No. 572,546, filed Aug. 15, 1966 now abandoned, and assigned to the same assignee.

This invention relates generally to an improved method and apparatus for the manufacture of slip cast, hollow, ceramic articles, and more particularly to a method and apparatus for the manufacture of slip cast fused silica radomes which are electrically correct as cast.

While various slip casting methods and apparatus for carrying out the methods are known in the prior art, slip cast articles made with these prior approaches have required tailoring and grinding to produce the desired end item. This is particularly true in the forming of articles such as radomes for missiles wherein electrical tolerances are required. The prior known attempts require electrical tape tailoring or diamond grinding to produce the proper surface contour of these radomes.

This invention overcomes the disadvantages of the prior art efforts in that articles such as radomes requiring certain electrical tolerances can now be directly cast, thereby eliminating the expense incurred by the tailoring and grinding required by the prior art approaches.

With the development of high performance guided missile weapon systems has come the need for a manner of economically producing accurately configured radomes. The interest in slip cast fused silica radomes stems from the fact that the material possesses exceptional thermal shock resistance, has good electrical properties at ambient and elevated temperatures, and is low in cost. This invention provides a method and apparatus capable of efficiently producing slip cast fused silica radomes.

Therefore, it is an object of this invention to provide a method and apparatus for manufacturing slip cast articles.

A further object of the invention is to provide a method and apparatus for producing slip cast fused silica articles which are cast to final configuration.

Another object of the invention is to provide a method and apparatus for producing radomes for high performance guided missiles.

Another object of the invention is to provide a method and apparatus for the manufacture of slip cast fused silica radomes which are electrically correct as cast.

Another object of the invention is to provide a method and apparatus for producing radomes which require no electrical tape tailoring or diamond grinding to meet electrical tolerances.

Other objects, not specifically set forth, will become readily apparent from the following description and accompanying drawings wherein:

FIG. 1 is a view partially broken away of a radome made in accordance with the invention and an adapter assembly therefor;

FIG. 2 is a view partially in cross-section of an embodiment of the assembly for producing the plaster shroud; and FIG. 3 is a partial, cross-sectional view of an embodiment of the inventive apparatus utilized to produce the FIG. 1 radome.

With the advent of high performance guided missiles, radomes therefor require specifi electrical tolerances. The glass ceramic radomes previously utilized on such missiles are expensive to fabricate and production thereof requires expensive tooling. Slip cast fused silica radomes made in accordance with this invention are relatively inexpensive and can be mass produced for purposes of industrial readiness with inexpensive tooling.

Fused silica possesses a combination of properties that make it attractive for radome applications. This material has exceptional thermal shock resistance due to the fact that its coefficient of thermal expansion is very low, $3 \times 10^{-7}$ in./in./° F. Its dielectric constant of 3.2 is virtually independent of temperature up to 1500° F. The loss tangent is both low, 0.0002, and stable with respect to temperautre. And finally, fused silica is both low in cost, 0.30 cent/lb. and can be cast using a simple but effective slip casting technique.

The method for making the precision cast radome blanks entails the placement of an impervious male mandrel into a female plaster mold. The slip casting begins when the ceraimc slip is pumped into the area between the mold and the male mandrel and continues until the casting build-up is stopped by the cast wall contacting the male mandrel. The preciseness of the cast radome blank is therefore dependent upon the tolerances of the mold and male mandrel, the positioning of the male mandrel, and the rigidity of the fixture that positions the male mandrel relative to the plaster of Paris mold.

Referring now to the drawings, a hollow dome 10, which in the illustrated example is a radome for a guided missile, is provided with an electrical test adapter assembly comprising an adapter 11 connected to a sleeve 12 via a plurality of clamps 13, sleeve 12 being secured to dome 10 in conventional manner. For adaptation to a missile, an adapter assembly would be mounted internally in the radome.

The plaster of Paris mold 14 (see FIG. 3) is formed by the assembly shown in FIG. 2 wherein a male mandrel 15, which may for example be machined from an aluminum billet, is secured by means not shown to a bottom plate 16 which may be of stainless steel. A bottom ring 17 is mounted to plate 16 via positioning pads 16' and supports a shroud 18 via flange 17', ring 17 and shroud 18 being positioned with respect to mandrel 15 such as to define a cavity 19 having the desired configuration of mold 14. A seal 20, such as an O-ring or suitable rubber or foam strip, is located between ring flange 17' and shroud 18 while a seal 21 is positioned between the sections of the shroud 18 which are secured together by fasteners such as bolts 22. The shroud 18 is provided with an inlet 23 through which plaster is forced into cavity 19. A seal 25 is positioned on ring 17 adjacent cavity 19.

The plaster mold 14 is conventionally formed by pumping a creamy plaster mix through inlet 23 into the cavity 19 surrounding the mandrel 15 and allowing it to harden and become integral with ring 17. The shroud 18 is then removed by the removal of bolts 22 after which the mandrel 15 is removed and the mold 14 is allowed to dry on ring 17.

Prior to the assembly of the FIG. 2 fixture, the mandrel 15 is cleaned and coated with well known suitable material to allow easy removal from within the mold 14, such material being for example a commercial product Thalco Mold Release paste 550. The sealing members 21 for the shroud 18 may for example comprise strips of ¼ inch foam rubber.

The creamy plaster mix pumped into cavity 19 may for example be commercially known Puritan Pottery Plaster made by U.S. Gypsum Company, slowly sifted into room temperature water to form a plaster consistency of 75 (75 parts water/100 parts plaster) and allowed to soak for a total of six minutes. A high speed mixer was then used to mix the plaster for five minutes. The fluid plaster was then allowed to cream until it no longer felt gritty and became creamy but fluid. The creaming time was 2–3 minutes with distilled water and 6–8 minutes with tap water.

The newly produced plaster of Paris mold 14 may be dried for eaxmple by placing in a circulating warm air dryer at 110°–120° F. for a satisfactory period of time.

Referring now to FIG. 3 the assembly for casting the dome 10 comprises the plaster of Paris mold 14 with the integral bottom ring or base plate 17 secured to mold 14 as described above with the sealing member 25 such as an O-ring positioned therebetween to prevent leakage. A positioning plate or pad 26 is positioned on support plate or ring 17 and serves to center and align male mandrel 27 with mold 14. Ring 17 and pads 26 may be constructed of stainless steel while the mandrel 27 may be machined from an aluminum billet. Located intermediate mandrel 27 and plate 17 are a pair of retainer rings 28 and 29. A pair of sealing members 30 and 31 such as O-rings are respectively positioned between ring 29- plate 17 and ring 29- mandrel 27 to prevent the slip from leaking from within cavity 32 defining the contour of dome 10. Ring 29 is provided with a passage 33 extending therethrough and which provides communication between cavity 32 and a countersink 34 in ring 28. A passageway 35 extends through ring 28 and provides communication between the countersink 34 and a fill pipe 36 which extends through the mandrel 27 and through passageway 35, whereby communication between fill pipe 36 and cavity 32 is established.

The removal of the male mandrel 27 from the casting or dome 10 is facilitated by covering the mandrel surface with a low friction material such as Teflon to a thickness, for example, of about 4 mil. Also, a sprayed organic coating can also be utilized to reduce friction of the mandrel during removal.

The preciseness of the cast radome 10 is dependent upon the dimensional tolerances of the mold 14 and mandrel 27, the positioning of mandrel 27, and the rigidity of the fixture (ring 17 and pads 26 and retainer rings 28 and 29) which positions the mandrel 27 relative to the plaster mold 14. Tolerances should be held such that the normal distance variation between the mandrel and mold surfaces is plus-or-minus 0.003 inch.

By way of example, and with the fixture assembled as shown in FIG. 3, fused silica slip is strained into the conventional pressure pot and the fill assembly connected to the fixture via fill pipe 36. A ten p.s.i. pressure is applied to fill the casting cavity 32 with the displaced air escaping through the mold. With the cavity filled, the fixture is then rotated to the tip down position as shown in FIG. 3 and the casting pressure increased to 40 p.s.i. The casting time for this example is approximately one hour, but may be of a longer period to insure complete casting since longer casting time is not detrimental. Upon completion the hose connection to the pressure pot (not shown) is broken at the mandrel fill pipe 36 to allow the excess slip to be removed by vacuum or other suitable method. The mandrel 27 is then removed by means of a suitable hoist or the like. Vacuum created by the removal of the mandrel is released by two holes (not shown) drilled into the fill passage 33 of the retainer ring 29 below the seal 31.

Initial drying of the casting or dome 10 in the mold 14 is accomplished, for example, by circulating air (100 cu. ft./hr.) in the cavity overnight. This dried the casting sufficiently to allow it to be handled. Next, the fixture is rotated to the tip-up position and the mold 14 removed from the casting 10, after which the casting is transferred to a warm air dryer. A schedule of 4–8 hours at 150° F. followed by 16 hours at 350° F. is used to remove all water from the casting before firing. The castings are next fired at 2200° F. for 3½ hours. Because of the very low thermal expansion of fused silica it is possible to insert and remove the casting from the hot zone of the electric bottom loading kiln without developing excessive thermal stresses. The fired radome blanks are then cut to length by placing them in a lathe equipped with a vacuum chuck and a high speed diamond cut-off wheel. The radome may then be provided with a suitable adapter assembly such as that shown in FIG. 1 for attachment to a missle or for other type of utilization.

The precision casting process of this invention utilizes a unique method which incorporates wall thickness changes into the initial cast radome, thus eliminating the need for tape tailoring or diamond grinding to meet electrical tolerances. The method of this invention is to change the surface contour of the male mandrel or plaster mold or both at the area which corresponds to the area on the cast radome requiring a dimensional change.

The removal of material from an area on the surface of the male mandrel 27 results in an increase in radome wall thickness, and the build-up of material on an area of the male mandrel 27 results in a decrease in wall thickness. The build-up of material on the male mandrel 15 will result in an increase of the radome wall thickness while the removal of material from the mandrel 15 will result in decreasing wall thickness, since an increase or a decrease of the mandrel 15 changes the wall thickness of the plaster mold 14.

During the forming process of the radome 10 allowance must be made for shrinkage of the material from which it is formed. For example, the fused silica slip has a shrinkage factor of about 1.5%.

Material removal from either mandrel can be accomplished by machining the mandrels and build-up material on either mandrel can be accomplished by the use of tape, organic coatings, sprayed metal, etc.

It has thus been shown that this invention provides a method and apparatus for making precision cast articles such as radomes by the placement of an impervious male mandrel into a female plaster of Paris mold, pumping a ceramic slip into the cavity therebetween, and allowing the slip casting process to continue until the case wall build-up contacts the impervious male mandrel. Articles such as radomes made in accordance with this invention are cast to proper wall thickness and thus meet desired electrical tolerances without the electrical tape tailoring or diamond grinding of the casting as required by prior known methods.

While specific cast articles, casting materials, times, temperatures, and other conditions have been set forth for purposes of description, it is not intended to limit the invention to these specific conditions.

Although particular embodiments of the end item and the apparatus for carrying out the process have been illustrated and described, modifications will become apparent to those skilled in the art, and it is intended to cover all such modifications as come within the true spirit and scope of this invention.

What we claim is:

1. A fixture for casting precision ceramic articles comprising a mold configured to define the external surface of the article to be cast, an impervious male mandrel positioned within the mold and configured to define the internal surface of the article to be cast, a base plate positioned intermediate said mold and said mandrel, a positioning pad positioned intermediate said base plate and said mandrel for positioning said mandrel with respect to said mold to define a cavity therebetween, sealing means between said mold and said base plate, at least one retainer ring means positioned between said base plate and said mandrel, sealing means between said ring means and each of said base plate and mandrel, each of said mandrel and ring means being provided with passageways providing fluid access to said cavity from the exterior of the fixture.

2. The fixture defined in claim 1, wherein said male mandrel is constructed of aluminum, and said mold is constructed of plaster of Paris.

3. The fixture defined in claim 1, wherein said mold is constructed from plaster of Paris.

4. The fixture definde in claim 1, wherein said mold and said base plate are formed so as to constitute an integral assembly with said sealing means positioned therebetween.

5. The fixture defined in claim 1, wherein said base plate comprises a body member having a central aperture therein and a flange portion, said flange portion extending in the direction of said mold and adapted to cooperate with said mold for holding said mold in alignment with respect to said central aperture.

6. The fixture defined in claim 5, wherein said mold is provided with a cut-away portion which is shaped to correspond to said base plate flange portion shape and cooperate therewith.

7. The fixture defined in claim 1, wherein said base plate comprises a body member having a central aperture therein and a shoulder portion adjacent said central aperture, and wherein said retainer ring means includes a pair of ring members, one of said ring members including a pair of different diameter portions, the larger diameter portion of said one ring member being disposed on said base plate shoulder portion while the smaller diameter portion of said one ring member is located in said central aperture intermediate said base plate and said male mandrel.

References Cited
UNITED STATES PATENTS

| | | | |
|---|---|---|---|
| 3,074,111 | 1/1963 | Wiltshire | 249—142 X |
| 2,844,857 | 7/1958 | Jones | 249—63 |

J. SPENCER OVERHOLSER, Primary Examiner

DE WALDEN W. JONES, Assistant Examiner

U.S. Cl. X.R.

25—118; 249—109, 135; 264—86